United States Patent
Kim et al.

(10) Patent No.: US 10,696,817 B2
(45) Date of Patent: *Jun. 30, 2020

(54) PLASTICIZER COMPOSITION, RESIN COMPOSITION AND METHOD OF PREPARING THE SAME

(71) Applicant: LG CHEM, LTD., Seoul (KR)

(72) Inventors: Hyun Kyu Kim, Daejeon (KR); Mi Yeon Lee, Daejeon (KR); Yun Ki Cho, Daejeon (KR); Jeong Ju Moon, Daejeon (KR); Joo Ho Kim, Daejeon (KR); Seok Ho Jeong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 91 days.

This patent is subject to a terminal disclaimer.

(21) Appl. No.: 15/767,586

(22) PCT Filed: Jun. 30, 2017

(86) PCT No.: PCT/KR2017/006998
§ 371 (c)(1),
(2) Date: Apr. 11, 2018

(87) PCT Pub. No.: WO2018/008914
PCT Pub. Date: Jan. 11, 2018

(65) Prior Publication Data
US 2018/0291178 A1    Oct. 11, 2018

(30) Foreign Application Priority Data
Jul. 6, 2016    (KR) .......................... 10-2016-0085685

(51) Int. Cl.
 C08K 5/11  (2006.01)
 C08K 5/1515  (2006.01)
 C08K 5/12  (2006.01)
 C08K 5/00  (2006.01)

(52) U.S. Cl.
CPC .............. *C08K 5/11* (2013.01); *C08K 5/0016* (2013.01); *C08K 5/12* (2013.01); *C08K 5/1515* (2013.01)

(58) Field of Classification Search
CPC .......... C08K 5/11; C08K 5/0016; C08K 5/12; C08K 5/1515; C08K 5/16; C08L 27/06
USPC ....................................................... 524/114
See application file for complete search history.

(56) References Cited

U.S. PATENT DOCUMENTS

| | | | |
|---|---|---|---|
| 4,020,966 A | 5/1977 | Wszolek | |
| 4,068,776 A | 1/1978 | Wszolek | |
| 4,077,935 A | 3/1978 | Wszolek | |
| 4,093,097 A | 6/1978 | Wszolek | |
| 10,377,864 B2 * | 8/2019 | Kim ........................ | C08K 5/11 |
| 2014/0309345 A1 | 10/2014 | Frenkel et al. | |
| 2015/0051326 A1 | 2/2015 | Sunkara et al. | |
| 2015/0051329 A1 | 2/2015 | Sunkara et al. | |
| 2016/0272780 A1 | 9/2016 | Kim et al. | |
| 2016/0376219 A1 | 12/2016 | Kim et al. | |
| 2017/0166724 A1 | 6/2017 | Kim et al. | |
| 2017/0369656 A1 | 12/2017 | Kim et al. | |
| 2018/0066124 A1 | 3/2018 | Kim et al. | |

FOREIGN PATENT DOCUMENTS

| | | |
|---|---|---|
| CN | 107406621 A | 11/2017 |
| EP | 2927210 A1 | 10/2015 |
| EP | 3281977 A1 | 2/2018 |
| EP | 3327075 A1 | 5/2018 |
| JP | 2016-033179 A | 3/2016 |
| KR | 1020140052838 A | 5/2014 |
| KR | 1020150093604 A | 8/2015 |
| WO | 2012/169081 A1 | 12/2012 |

OTHER PUBLICATIONS

WO 2012169081 A1, machine translation, EPO espacenet. (Year: 2012).*
Database WPI: "Adhesive paste sol composition used for forming resin layer of e.g. canvas, comprises preset amount of triisocyanate compound, vinyl chloride-type resin, and plasticizer chosen from e.g. dialkyl isophthalate and dialkyl terephthalate", XP002786032, Thomson Scientific, Mar. 10, 2016.
Database WPI: "Vinyl-chloride resin composition used in medical instruments e.g. medical tubing, comprises vinyl chloride resin and di(2-ethyl hexyl)isophthalate in specified amount", XP002786033, Thomson Scientific, Dec. 13, 2012.

* cited by examiner

*Primary Examiner* — Josephine L Chang
(74) *Attorney, Agent, or Firm* — Dentons US LLP

(57) ABSTRACT

The present invention relates to a plasticizer composition, a resin composition including the same, and a method of preparing the same, the plasticizer comprising an ester-based material including di(2-ethylhexyl)isophthalate and epoxidized oil, and having a weight ratio of the di(2-ethylhexyl)isophthalate and the epoxidized oil is 60:40 to 10:90.

8 Claims, No Drawings

PLASTICIZER COMPOSITION, RESIN COMPOSITION AND METHOD OF PREPARING THE SAME

CROSS REFERENCE

This application is a National Stage Application of International Application No. PCT/KR2017/006998, filed Jun. 30, 2017, and claims the benefit of Korean Patent Application No. 10-2016-0085685, filed Jul. 6, 2016, contents of which are incorporated herein by reference in their entirety for all purposes as if fully set forth below.

TECHNICAL FIELD

The present invention relates to a plasticizer composition, a method of preparing the same and a resin composition comprising the same.

Background Art

Conventionally, a plasticizer forms an ester through a reaction between an alcohol and a polycarboxylic acid such as phthalic acid or adipic acid. In addition, in consideration of domestic and international regulations for phthalate-based plasticizers harmful to humans, there is ongoing research on plasticizer compositions that can replace phthalate-based plasticizers such as terephthalate-, adipate-, and other polymer-based plasticizers.

Meanwhile, in the compound industry requiring high thermal resistance and low volatile loss as the main physical properties, in consideration of the required physical properties, it is necessary to use suitable plasticizers. For PVC compounds for wires and cables, depending on properties required for corresponding specifications, such as tensile strength, an elongation rate, plasticization efficiency, volatile loss, tensile strength and elongation retentions, etc., a third material such as a plasticizer, a stabilizer, or a pigment may be mixed with a PVC resin.

At present, as plasticizers widely used in extrusion, injection, calendering and compound industries such as wires, flooring materials, interior materials for automobiles, films, sheets, hoses, tubes, etc., phthalate products such as diisononylphthalate (DINP), diisodecylphthalate (DIDP), etc. have been widely used.

However, such phthalate products are products which are restricted in use or which need to be restricted depending on the use of a product, and to satisfy such requirements of a market, a non-phthalate product such as diethylhexyl terephthalate (DOTP or DEHTP) has been widely used, but an improvement in quality is required.

In order to address environmental issues and needs for improving product quality to an equal or higher level than conventional products, it is necessary to develop a new product which is basically environmentally friendly and has improved qualities compared to the conventional products, and therefore, an environmentally-friendly and novel plasticizer composition product with excellent physical properties compared to the widely-used products needs to be developed, and research to ensure a vinyl chloride-based resin composition, which is free from environmental issues and has excellent qualities, is progressing.

DISCLOSURE

Technical Problem

Therefore, while conducting research on plasticizers, the inventors identified a plasticizer composition that can improve the physical properties of a vinyl chloride-based resin composition, and thus the present invention was completed.

That is, the present invention is directed to providing a plasticizer composition capable of improving physical properties hardness, tensile strength and elongation retentions, migration loss and volatile loss when used as a plasticizer for a resin composition, a method of preparing the same and a resin composition comprising the same.

Technical Solution

In one aspect, the present invention provides a plasticizer composition, which comprises an ester-based material comprising di(2-ethylhexyl)isophthalate; and epoxidized oil, and a weight ratio of the di(2-ethylhexyl)isophthalate and the epoxidized oil is 60:40 to 10:90.

The weight ratio of the di(2-ethylhexyl)isophthalate and the epoxidized oil may be 50:50 to 10:90.

The plasticizer composition may further comprise a third material, and a weight ratio of the mixture of the di(2-ethylhexyl)isophthalate and the epoxidized oil to the third material is 9:1 to 1:9.

The third material may include one or more compounds selected from the group consisting of a phthalate-based compound, a citrate-based compound and a trimellitate-based compound.

The third material may include one or more selected from the group consisting of di(2-propylheptyl)phthalate, diisodecylphthalate, diisononylphthalate, acetyltributylcitrate (ATBC), tributylcitrate (TBC), acetyltriethylhexylcitrate (ATEHC), triethylhexylcitrate (TEHC), acetyltriisononylcitrate (ATINC), triisononylcitrate (TINC), triisobutyl trimellitate (TiBTM), trinormalbutyl trimellitate (TnBTM), triethylhexyl trimellitate (TEHTM) and triisononyl trimellitate (TINTM).

In another aspect, the present invention provides a resin composition comprising 100 parts by weight of a resin; and 5 to 150 parts by weight of the above-described plasticizer composition.

The resin may be one or more selected from the group consisting of ethylene vinyl acetate, polyethylene, polypropylene, polyketone, polyvinyl chloride, polystyrene, polyurethane, and a thermoplastic elastomer.

The resin composition may be applied to prepare one or more selected from the group consisting of wires, flooring materials, interior materials for automobiles, films, sheets, wallpaper and tubes.

Advantageous Effects

A plasticizer composition according to an exemplary embodiment of the present invention can improve physical properties such as plasticization efficiency, tensile strength and an elongation rate, and provide excellent physical properties such as migration loss and volatile loss, when used in a resin composition.

MODES OF THE INVENTION

EXAMPLES

Hereinafter, to explain the present invention in detail, the present invention will be described in detail with reference to examples. However, the examples according to the present invention may be modified in a variety of different forms, and the scope of the present invention should not be construed as being limited to the examples to be described below. The exemplary embodiments of the present invention are provided for those of ordinary skill in the art to more fully understand the present invention.

Preparation Example 1

Preparation of di(2-ethylhexyl)isophthalate (DEHIP)

498.0 g of purified isophthalic acid (PIA), 387.0 g of 2-ethylhexyl alcohol (2-EHA; molar ratio of PIA: 2-EHA: 1.0:3.0), and 1.54 g of a titanium-based catalyst (tetra isopropyl titanate (TIPT); 0.31 parts by weight with respect to 100 parts by weight of PIA) were added to a 3L 4-neck reaction vessel equipped with a cooler, a water stripper, a condenser, a decanter, a reflux pump, a temperature controller, an agitator, etc., and a temperature was slowly increased to approximately 170° C. At approximately 170° C., water was generated, and esterification was performed for approximately 4.5 hours while a nitrogen gas was continuously added at a reaction temperature of approximately 220° C. under atmospheric pressure, and then terminated when an acid value reached 0.01.

After the reaction was completed, distillation extraction was performed for 0.5 to 4 hours under reduced pressure to remove unreacted components. To remove unreacted components at a predetermined content or less, steam extraction was performed using steam for 0.5 to 3 hours under reduced pressure, and neutralization was performed using an alkali solution after a reaction solution was cooled to approximately 90° C. Additionally, washing could be performed, and then the reaction solution was dehydrated to remove moisture. Filter media were input into the dehydrated reaction solution, stirred for a predetermined time and then filtered, thereby finally obtaining 1243.3 g of DEHIP (yield: 99.0%).

Examples 1 to 15 and Comparative Examples 1 to 7

Plasticizer compositions of Examples 1 to 15 and Comparative Examples 1 to 7 were configured as follows.

TABLE 1

|  | IP-based | Epoxidized oil | Mixed ratio |
|---|---|---|---|
| Example 1 | DEHIP | ESO | 6:4 |
| Example 2 | DEHIP | ESO | 5:5 |
| Example 3 | DEHIP | ESO | 4:6 |
| Example 4 | DEHIP | ESO | 3:7 |
| Example 5 | DEHIP | ESO | 2:8 |
| Example 6 | DEHIP | ESO | 1:9 |
| Example 7 | DEHIP | ELO | 5:5 |
| Example 8 | DEHIP | ELO | 3:7 |
| Example 9 | DEHIP | ELO | 1:9 |
| Comparative Example 1 | DEHIP | — | — |
| Comparative Example 2 | DEHTP (terephthalate) | — | — |
| Comparative Example 3 | DEHIP | ESO | 95:5 |
| Comparative Example 4 | DEHIP | ESO | 8:2 |
| Comparative Example 5 | DEHIP | ESO | 7:3 |

* DEHTP: LG Chemical, GL300
* ESO: CCP, Epoxidized Soybean Oil
* ELO: Arkema, Vikoflex 7190

TABLE 2

|  | IP-based | Epoxidized oil (EO) | Mixed ratio | Third material | (IP + EO):third material |
|---|---|---|---|---|---|
| Example 10 | DEHIP | ESO | 6:4 | DPHP | 9:1 |
| Example 11 | DEHIP | ESO | 5:5 | DIDP | 7:3 |
| Example 12 | DEHIP | ESO | 4:6 | TEHC | 5:5 |
| Example 13 | DEHIP | ESO | 3:7 | TINTM | 4:6 |
| Example 14 | DEHIP | ESO | 2:8 | TEHTM | 3:7 |
| Example 15 | DEHIP | ESO | 1:9 | TBTM | 2:8 |
| Comparative Example 6 | — | — | — | DPHP | — |
| Comparative Example 7 | — | — | — | TEHTM | — |

* DPHP: di(2-propylheptyl) phthalate (LG Chemical, DPHP)
* DIDP: diisodecylphthalate (LG Chemical, DIDP)
* TEHC: tri(2-ethylhexyl) citrate (LG Chemical, TEHC)
* TBC: tributylcitrate (LG Chemical, TBC)
* TEHTM: tri(2-ethylhexyl) trimellitate (LG Chemical, TEHTM)
* TBTM: tributyl trimellitate (LG Chemical, TBTM)

<Test Items of Physical Properties>

Measurement of Hardness

According to ASTM D2240, Shore hardness was measured using a 3T sheet for 10 seconds at 25° C.

Measurement of Tensile Strength

According to ASTM D638, each specimen was pulled at a cross head speed of 200 mm/min (1T) using a tester, U.T.M, (Manufacturer; Instron, Model No.; 4466), and a position at which the specimen was broken was detected. Tensile strength was calculated as follows:

Tensile strength ($kgf/cm^2$)=Load value (kgf)/Thickness (cm)×Width (cm)

Measurement of Elongation Rate

According to ASTM D638, each specimen was pulled at a cross head speed of 200 mm/min (1T) using the U.T.M, and a position at which the specimen was broken was detected. An elongation rate was calculated as follows:

Elongation rate (%)=Length after elongation/Initial length×100

Measurement of Migration Loss

An experimental specimen having a thickness of 2 mm or more was obtained according to KSM-3156, and PS plates were attached to both sides of the specimen, followed by applying a load of 1 $kgf/cm^2$. The specimen was maintained in a forced convection oven (80° C.) for 72 hours, and cooled to room temperature for 4 hours. Afterward, following removal of the PS plates attached to both sides of the specimen, the weights of the specimen before and after the maintenance in the oven were measured to calculate a migration loss by the equation below.

Migration loss (%)=[(Initial weight of specimen at room temperature−Weight of specimen after maintained in oven)/Initial weight of specimen at room temperature]×100

Measurement of Volatile Loss

The prepared specimen was processed at 100° C. for 168 hours, and a weight of the specimen was measured.

Volatile loss (wt %)=[(Initial weight of specimen−Weight of specimen after processed at 100° C. for 168 hours)/Initial weight of specimen]×100

Stress Test

A stress test was carried out by maintaining the specimen in a bent state at room temperature for a predetermined time, and observing degrees of migration and deformation (degree of leakage). The degrees were numerically expressed, and a value approaching 0 indicates excellent properties.

Measurement of Tensile Strength and Elongation Retentions

Measurement of tensile strength and elongation retentions was carried out by applying heat to specimens at 100° C. for 168 hours, and measuring tensile strength and an elongation rate remaining in the specimens, and measurement methods are the same as those for tensile strength and an elongation rate.

Experimental Example

Manufacture of Sheet and Evaluation of Performance

Referring to ASTM D638, the plasticizer compositions of Examples 1 to 15 and Comparative Examples 1 to 7 were manufactured as specimens for experiments by the following method, respectively.

With respect to 100 parts by weight of a poly(vinyl chloride) resin (PVC (LS100S)), 40 parts by weight of each of the plasticizer compositions prepared in the examples and comparative examples, 13 parts by weight of BZ153T as a stabilizer, 14 parts by weight of calcium carbonate (OMYA 1T) and 0.3 parts by weight of stearic acid were blended and then mixed at 700 rpm and 98° C. The resulting mixture was processed using a roll mill at 170° C. for 4 minutes, and using a press at 180° C. for 2.5 minutes (low pressure) and 2 minutes (high pressure), thereby preparing specimens.

Evaluations were carried out for the specimens on the basis of the above-described items, and performance evaluation results for each specimen are shown in Tables 3 and 4. However, for the stress test, the specimens were maintained for 7 days, followed by observation.

TABLE 3

|  | Hardness (Shore A) | Tensile strength (kg/cm$^2$) | Tensile strength retention (%) | Elongation rate (%) | Elongation retention (%) | Migration loss (%) | Volatile loss (%) | Stress test (7 days) |
| --- | --- | --- | --- | --- | --- | --- | --- | --- |
| Example 1 | 92.3 | 237.0 | 86.5 | 299.2 | 75.6 | 1.37 | 1.60 | 0.5 |
| Example 2 | 92.3 | 235.5 | 84.6 | 297.4 | 73.4 | 1.24 | 1.41 | 0.5 |
| Example 3 | 92.4 | 231.3 | 88.3 | 298.0 | 71.0 | 1.01 | 1.07 | 0.5 |
| Example 4 | 92.5 | 228.2 | 89.3 | 294.0 | 72.6 | 0.88 | 0.82 | 0.5 |
| Example 5 | 92.7 | 225.6 | 92.3 | 294.2 | 76.9 | 0.65 | 0.54 | 0.5 |
| Example 6 | 92.7 | 221.5 | 95.3 | 291.1 | 74.4 | 0.53 | 0.49 | 0.5 |
| Example 7 | 92.1 | 232.5 | 90.4 | 292.4 | 78.1 | 1.00 | 1.20 | 0.5 |
| Example 8 | 92.2 | 230.2 | 93.2 | 293.7 | 82.4 | 0.76 | 0.65 | 0.5 |
| Example 9 | 92.5 | 224.1 | 98.8 | 293.6 | 83.5 | 0.48 | 0.31 | 0.5 |
| Comparative Example 1 | 91.3 | 213.4 | 34.2 | 278.3 | 45.2 | 2.73 | 3.68 | 3.0 |
| Comparative Example 2 | 92.9 | 216.1 | 53.4 | 282.4 | 48.4 | 2.55 | 2.88 | 3.0 |
| Comparative Example 3 | 91.5 | 240.9 | 38.9 | 302.8 | 45.9 | 2.15 | 3.59 | 2.0 |
| Comparative Example 4 | 92.0 | 237.9 | 46.8 | 298.4 | 50.3 | 1.97 | 3.01 | 2.0 |
| Comparative Example 5 | 92.3 | 235.8 | 55.3 | 296.7 | 60.7 | 1.79 | 2.27 | 1.5 |

As shown in Table 3, compared to Examples, it can be confirmed that Comparative Examples 1 and 2 in which epoxidized oil was not mixed exhibited poor levels of all physical properties. In addition, compared to Comparative Examples 3 to 5 comprising isophthalate at 70 wt %, 80 wt % and 95 wt %, higher than 60 wt %, it can be confirmed that Examples 1 to 9 comprising 40 wt % of epoxidized oil were greatly improved in tensile strength retention and elongation retention, and plasticizers exhibiting an excellent level of stress resistance, as well as volatile loss and migration loss.

Therefore, it can be seen that it is necessary to mix the epoxidized oil with the isophthalate-based material, and when 40 wt % or more of the epoxidized oil is contained, plasticizers can exhibit excellent physical properties.

TABLE 4

|  | Hardness (Shore A) | Tensile strength (kg/cm$^2$) (%) | Tensile strength retention | Elongation rate (%) | Elongation retention (%) | Migration loss (%) | Volatile loss (%) | Stress test (7 days) |
| --- | --- | --- | --- | --- | --- | --- | --- | --- |
| Example 10 | 92.2 | 240.5 | 89.2 | 294.3 | 83.8 | 1.02 | 1.41 | 0.5 |
| Example 11 | 92.0 | 245.7 | 89.5 | 294.5 | 88.2 | 0.39 | 0.68 | 0 |
| Example 12 | 92.5 | 248.9 | 94.6 | 288.1 | 93.5 | 0.45 | 0.27 | 0 |
| Example 13 | 92.7 | 241.3 | 98.7 | 280.4 | 95.6 | 0.32 | 0.15 | 0 |
| Example 14 | 92.5 | 230.1 | 95.4 | 277.0 | 91.3 | 0.43 | 0.11 | 0 |
| Example 15 | 92.1 | 236.8 | 96.8 | 274.5 | 93.2 | 0.30 | 0.14 | 0 |

TABLE 4-continued

|  | Hardness (Shore A) | Tensile strength (kg/cm²) | Tensile strength retention (%) | Elongation rate (%) | Elongation retention (%) | Migration loss (%) | Volatile loss (%) | Stress test (7 days) |
|---|---|---|---|---|---|---|---|---|
| Comparative Example 6 | 94.2 | 212.5 | 84.4 | 277.2 | 88.4 | 1.97 | 1.61 | 1.5 |
| Comparative Example 7 | 96.7 | 226.8 | 92.3 | 256.2 | 95.1 | 0.66 | 0.34 | 0.5 |

As shown in Table 4, Examples 10 to 15 are prepared by adding a phthalate-based material, a trimellitate-based material or a citrate-based material as a third material to each of the plasticizer compositions of Examples 1 to 6, thereby providing more improved physical properties.

Specifically, in the comparison of Examples 1 to 6 and Examples 10 to 15, when a third material is added, a tensile strength, tensile strength retention, and elongation retention may be more improved, and migration loss, volatile loss and resistance to stress can also be improved.

In addition, it can be confirmed that Comparative Examples 6 and 7 using only a third material exhibit high hardness and low plasticization efficiency, particularly, Comparative Example 6 exhibits poor tensile strength and elongation retentions, a poor migration characteristic, volatile loss and migration loss and poor resistance to stress, and Comparative Example 7, although not a material which is cost-competitive, exhibits a very poor elongation rate, a significantly high level of hardness, and also poor plasticization efficiency.

Therefore, it can be seen that physical properties can be improved when a third material is added to a mixed plasticizer composition in which an isophthalate-based material and epoxidized oil are mixed, compared to a 2-component plasticizer composition, and all of cost competitiveness and basic physical properties are improved, compared to when a third material is used alone.

While the present invention has been described in detail with reference to exemplary embodiments of the present invention, it should be understood to those of ordinary skill in the art that the scope of the present invention is not limited thereto, but also includes various forms of modification and alteration based on the fundamental ideas of the present invention defined by the accompanying claims.

Hereinafter, the present invention will be described in detail.

According to an exemplary embodiment, the present invention provides a plasticizer composition comprising di(2-ethylhexyl)isophthalate and epoxidized oil.

The plasticizer composition comprises di(2-ethylhexyl)isophthalate and epoxidized oil, and a resin prepared of the plasticizer composition in which the di(2-ethylhexyl)isophthalate and the epoxidized oil are mixed, compared to a resin prepared of a plasticizer composition in which the di(2-ethylhexyl)isophthalate is contained alone, may have more excellent physical properties such as tensile strength or an elongation rate, and also have excellent tensile strength and elongation retentions, volatile loss and migration loss.

Here, in the plasticizer composition, the di(2-ethylhexyl)isophthalate and the epoxidized oil are preferably contained at ratio of, for example, 60:40 to 10:90, and it may be advantageous in terms of physical properties that the epoxidized oil is contained at a much larger content than di(2-ethylhexyl)isophthalate, and the ratio is more preferably 50:50 to 10:90. In this case, compared to when the di(2-ethylhexyl)isophthalate is used alone, or more than 60 wt % of the di(2-ethylhexyl)isophthalate is contained, when at least 40 wt % of the epoxidized oil is added, an effect of improving physical properties may be seen, and the content is preferably 50 wt % or more.

The epoxidized oil may be, for example, epoxidized soybean oil, epoxidized castor oil, epoxidized linseed oil, epoxidized palm oil, epoxidized stearate, epoxidized oleate, epoxidized tall oil, epoxidized linoleate or a mixture thereof.

Preferably, the epoxidized oil is epoxidized soybean oil (ESO) or epoxidized linseed oil (ELO), but the present invention is not limited thereto. However, due to market circumstances or problems in supply and demand, compared to ELO, the ESO may be used with a higher frequency.

The plasticizer composition may further comprise a third material, and a weight ratio of the mixture of the di(2-ethylhexyl)isophthalate and the epoxidized oil to the third material may be 9:1 to 1:9, and preferably 7:3 to 1:9.

While physical properties such as a stress characteristic of the resin composition may be improved only with the third material, there are problems of deterioration of plasticization efficiency, a decrease in the absorption rate of a plasticizer, and deterioration of price competitiveness. However, when the third material is incorporated into the mixed plasticizer composition of the isophthalate-based material and the epoxidized oil in the above range of contents, physical properties such as plasticization efficiency, absorption rate, improvement in migration may be overall improved, and also ensure price competitiveness of the final product.

The third material may include one or more compounds selected from the group consisting of a phthalate-based compound, a citrate-based compound and a trimellitate-based compound.

The phthalate-based compound may be, for example, di(2-propylheptyl)phthalate, diisodecylphthalate, or diisononylphthalate, and as the citrate-based compound, various citrate-based compounds such as acetyltributylcitrate (ATBC), tributylcitrate (TBC), acetyltriethylhexylcitrate (ATEHC), triethylhexylcitrate (TEHC), acetyltriisononylcitrate (ATINC) and triisononylcitrate (TINC) may be used. In addition, similar to the citrate-based compound, various types of trimellitate-based compounds such as triisobutyl trimellitate (TiBTM), trinormalbutyl trimellitate (TnBTM), triethylhexyl trimellitate (TEHTM), and triisononyl trimellitate (TINTM) may also be used.

As described above, when a phthalate-based compound, a citrate-based compound or a trimellitate-based compound is used as the third material, plasticization efficiency, tensile strength, and an elongation rate may be improved, and effects such as stress migration, migration loss, etc. may be additionally obtained according to a mixed material.

In the present invention, a method of preparing the plasticizer composition may be a blending method, and an example of the blending method is as follows.

Di(2-ethylhexyl)isophthalate and epoxidized oil are prepared. The di(2-ethylhexyl)isophthalate and the epoxidized oil may be blended at a weight ratio of 6:4 to 1:9, thereby preparing the plasticizer composition.

In the blending method, the di(2-ethylhexyl)isophthalate may be prepared by direct esterification by adding isophthalic acid to 2-ethylhexyl alcohol, adding a catalyst to allow a reaction under a nitrogen atmosphere; removing an unreacted alcohol and neutralizing an unreacted acid; and performing dehydration and filtration by vacuum distillation.

In addition, the 2-ethylhexyl alcohol may be used in a range of 150 to 500 mol %, 200 to 400 mol %, 200 to 350 mol %, 250 to 400 mol %, or 270 to 330 mol % on the basis of 100 mol % of isophthalic acid.

Further, the 2-ethylhexyl alcohol may be used in a range of 150 to 500 mol %, 200 to 400 mol %, 200 to 350 mol %, 250 to 400 mol %, or 270 to 330 mol % on the basis of 100 mol % of isophthalic acid.

Meanwhile, the catalyst may be any catalyst that can be used in esterification without particular limitation, and for example, one or more selected from acidic catalysts such as sulfuric acid, hydrochloric acid, phosphoric acid, nitric acid, para-toluenesulfonic acid, methanesulfonic acid, ethanesulfonic acid, propanesulfonic acid, butanesulfonic acid, and an alkyl sulfate, metal salts such as aluminum sulfate, lithium fluoride, potassium chloride, cesium chloride, calcium chloride, iron chloride and aluminum phosphate, metal oxides such as a heteropoly acid, natural/synthetic zeolites, cation and anion exchange resins, and organic metals such as a tetra alkyl titanate and a polymer thereof. Preferably, the catalyst is a tetra alkyl titanate.

An amount of the catalyst used herein may vary according to its type, and as an example, a homogeneous catalyst may be used in a range of 0.01 to 5 wt %, 0.01 to 3 wt %, 1 to 5 wt % or 2 to 4 wt % with respect to 100 wt % of the total reactants, and a heterogeneous catalyst may be used in a range of 5 to 200 wt %, 5 to 100 wt %, 20 to 200 wt %, or 20 to 150 wt % with respect to the total weight of the reactants.

Here, the reaction temperature may be in a range of 180 to 280, 200 to 250, or 210 to 230° C.

The plasticizer composition prepared as described above may be contained at 5 to 150 parts by weight, 40 to 100 parts by weight, or 40 to 50 parts by weight with respect to 100 parts by weight of a resin such as ethylene vinyl acetate, polyethylene, polyketone, polypropylene, polyvinyl chloride, polystyrene, polyurethane, a thermoplastic elastomer, or a mixture thereof, and therefore, a resin composition which is effective in all of compound formulation and/or sheet formulation may be provided.

According to an exemplary embodiment of the present invention, the resin composition may further comprise a filler.

The filler may be contained at 0 to 300 parts by weight, preferably 50 to 200 parts by weight, and more preferably 100 to 200 parts by weight on the basis of 100 parts by weight of the resin.

According to an exemplary embodiment of the present invention, the filler may be any filler known in the art without particular limitation. For example, the filler may be a mixture of one or more selected from silica, magnesium carbonate, calcium carbonate, hard coal, talc, magnesium hydroxide, titanium dioxide, magnesium oxide, calcium hydroxide, aluminum hydroxide, aluminum silicate, magnesium silicate and barium sulfate.

In addition, according to an exemplary embodiment of the present invention, the resin composition may further comprise other third materials such as a stabilizer, etc. when needed.

As an example, the other third material such as a stabilizer may be contained at 0 to 20 parts by weight, and preferably, 1 to 15 parts by weight on the basis of 100 parts by weight of the resin.

A stabilizer that can be used according to an exemplary embodiment of the present invention may be, for example, a calcium-zinc-based (Ca—Zn-based) stabilizer such as calcium-zinc combined stearate salt, but the present invention is not limited thereto.

The resin composition can be applied to various fields, as non-limited examples, such as in production of wires, flooring materials, interior materials for automobile, films, sheets, wallpaper or tubes.

The invention claimed is:

1. A plasticizer composition, comprising:
di(2-ethylhexyl)isophthalate; and epoxidized oil,
wherein a weight ratio of the di(2-ethylhexyl)isophthalate and the epoxidized oil is 60:40 to 10:90,
wherein the plasticizer composition further comprises a third material, and
wherein the third material includes one or more selected from the group consisting of a phthalate-based compound, a citrate-based compound and a trimellitate-based compound.

2. The plasticizer composition of claim 1, wherein the weight ratio of the di(2-ethylhexyl)isophthalate and the epoxidized oil is 50:50 to 10:90.

3. The plasticizer composition of claim 1, wherein the epoxidized oil includes one or more oils selected from the group consisting of epoxidized soybean oil, epoxidized castor oil, epoxidized linseed oil, epoxidized palm oil, epoxidized stearate, epoxidized oleate, epoxidized tall oil and epoxidized linoleate.

4. The plasticizer composition of claim 1, wherein a weight ratio of a mixture of the di(2-ethylhexyl)isophthalate and the epoxidized oil to the third material is 9:1 to 1:9.

5. The plasticizer composition of claim 4, wherein the third material includes one or more selected from the group consisting of di(2-propylheptyl)phthalate, diisodecylphthalate, diisononylphthalate, acetyltributylcitrate (ATBC), tributylcitrate (TBC), acetyltriethylhexylcitrate (ATEHC), triethylhexylcitrate (TEHC), acetyltriisononylcitrate (ATINC), triisononylcitrate (TINC), triisobutyl trimellitate (TiBTM), trinormalbutyl trimellitate (TnBTM), triethylhexyl trimellitate (TEHTM) and triisononyl trimellitate (TINTM).

6. A resin composition, comprising:
100 parts by weight of a resin; and
5 to 150 parts by weight of the plasticizer composition of claim 1.

7. The resin composition of claim 6, wherein the resin includes one or more selected from the group consisting of ethylene vinyl acetate, polyethylene, polypropylene, polyketone, polyvinyl chloride, polystyrene, polyurethane, and a thermoplastic elastomer.

8. The resin composition of claim 6, wherein the resin composition is applied to prepare one or more selected from the group consisting of wires, flooring materials, interior materials for automobiles, films, sheets, wallpaper and tubes.

\* \* \* \* \*